J. F. GLIDDEN.
PROCESS FOR ORNAMENTING SURFACES.
APPLICATION FILED MAY 24, 1909.
1,001,585.
Patented Aug. 22, 1911.
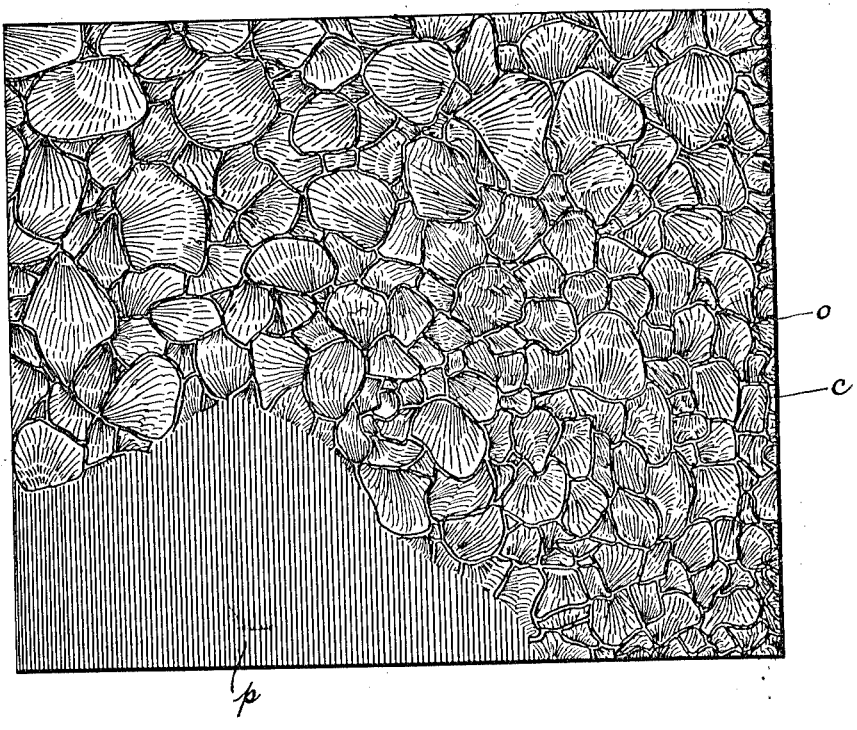
Witnesses:
Emmett W. Kilcran
Charles J. Schmidt.
Inventor:
Joseph F. Glidden
By Offield, Towle, Graves & Offield
Attorneys

UNITED STATES PATENT OFFICE.

JOSEPH F. GLIDDEN, OF CLEVELAND, OHIO.

PROCESS FOR ORNAMENTING SURFACES.

1,001,585. Specification of Letters Patent. Patented Aug. 22, 1911.

Application filed May 24, 1909. Serial No. 497,955.

*To all whom it may concern:*

Be it known that I, JOSEPH F. GLIDDEN, a citizen of the United States, residing at Cleveland, in the county of Cuyahoga and State of Ohio, have invented a certain new and useful Improved Process for Ornamenting Surfaces, of which the following is a full, clear, concise, and exact description.

My invention covers an improved process for ornamenting surfaces.

By means of my process I produce a coating or finish which is very ornamental and very desirable on steel, iron or other metal structures and objects, or on wood, paper, glass, or in fact, on any surface, which it is desired to decorate or ornament.

The process involves essentially the application of a layer or coat of some oil or substance which will coagulate, as when subjected to the effects of some chemical, such as acid or alkali. A substance which it is very desirable to use for this purpose is tung oil, more familiarly known as Chinese or Japanese wood oil, this oil being applied by means of brushing, painting, spraying, or in any other manner to the surface to be ornamented, and while the oil is still wet or unoxidized, it is subjected to the effects of some acid or alkali. Nitric acid is preferable, the oil being subjected to the fumes thereof. The oil referred to has strong coagulative qualities when thus subjected to the effects of acid, the result being that the oil coagulates and hardens and forms a coating having a coagulated or cellular appearance which is very ornamental and also protective. A pigment can be added to the oil to give any desired color to the coating. Metallic materials such as copper, aluminum and gold bronzes could also be added to give a metallic effect to the coating. On some surfaces, it is desirable to first apply a priming coat, such as a vehicle, composed of oils, japan and volatile hydrocarbons. After this priming coating has become thoroughly dry, the oil is applied which forms the decorative coating, and before this oil has dried or oxidized, the acid treatment is given as before described. In the priming coating, pigments may also be included to give the desired color or effect which will appear through the outer decorative coating which is translucent.

This decorative coating is particularly effective when applied to glass. The oil is coated on the glass in any manner and then subjected to the effects of acid whereupon a translucent coating is formed which has the coagulated and cellular, and somewhat crystalline appearance. The surface thus formed is a close imitation of the chipped glass effect, but is far more desirable, as the coating can be removed at any time. Glass treated with the decorative coating is also much cheaper than chipped glass, which requires an extensive and expensive process for its manufacture. Many decorative effects can also be produced by applying pigments or other material to the oil before it is applied to the glass. The decorative coating is hard and not very readily scratched off. It is also insoluble except in substances which would not be apt to come into contact with the coating, except when purposely applied thereto, and the life of the coating, is therefore, very long.

I do not wish to be limited to only the substances which I have mentioned, as any material could be used which would harden into a coating having a coagulative cellular appearance after being suitably treated as by acids or alkalis.

On the accompanying drawing, the figure shows the decorative effect produced.

*o* represents the object whose surface is decorated by the coating *c* of Chinese oil or other coagulative substance which has been subjected to the coagulating effects of some chemical such as nitric acid. Part of the decorative coating has been omitted on the drawing to show a priming coat *p* which will give a color effect to the decorative coating *c* which is translucent.

I desire to secure the following claims by Letters Patent:

1. The process for ornamenting surfaces which consists in applying a coating of coagulable oil to the surface and then subjecting said oil to the effects of an acid to cause coagulation and hardening thereof.

2. The process for decorating a surface which consists in applying a coagulable oil to the surface and then subjecting said oil to acid fumes to cause coagulation and hardening thereof, and thereby the formation of an ornamental coating on the surface having a coagulated cellular appearance.

3. The process for ornamenting surfaces which consists in applying a coating of coagulable oil to the surface and then subjecting said oil to the effects of a caustic substance to cause coagulation and hardening thereof.

JOSEPH F. GLIDDEN.

Witnesses:
R. S. LEONARD,
E. C. SHURTLEFF.